United States Patent
Allo et al.

(10) Patent No.: US 11,611,589 B2
(45) Date of Patent: Mar. 21, 2023

(54) DATA STORAGE SYSTEM WITH POWERED MOVE ATTACK PROTECTION

(71) Applicant: Seagate Technology LLC, Fremont, CA (US)

(72) Inventors: Christopher N. Allo, Lyons, CO (US); Saheb Biswas, Boulder, CO (US); Kevin G. Sternberg, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 375 days.

(21) Appl. No.: 16/946,088

(22) Filed: Jun. 5, 2020

(65) Prior Publication Data
US 2021/0385249 A1    Dec. 9, 2021

(51) Int. Cl.
*H04L 9/40* (2022.01)

(52) U.S. Cl.
CPC .......... *H04L 63/20* (2013.01); *H04L 63/1441* (2013.01)

(58) Field of Classification Search
CPC ............................. H04L 63/20; H04L 63/1441
See application file for complete search history.

(56) References Cited

U.S. PATENT DOCUMENTS

| | | | |
|---|---|---|---|
| 7,493,656 B2 * | 2/2009 | Goodwill | G06F 21/80 713/189 |
| 8,732,089 B1 | 5/2014 | Fang et al. | |
| 9,589,127 B2 | 3/2017 | Copsey | |
| 9,794,228 B2 | 10/2017 | Li et al. | |
| 10,083,284 B2 | 9/2018 | Koch et al. | |
| 10,178,394 B2 | 1/2019 | Bar et al. | |
| 10,373,104 B2 | 8/2019 | Buchmueller et al. | |
| 2003/0046593 A1 * | 3/2003 | Xie | H04L 9/0822 726/33 |
| 2009/0217368 A1 | 8/2009 | Buss et al. | |
| 2013/0173986 A1 * | 7/2013 | Sakata | G06F 11/1004 714/755 |
| 2018/0004953 A1 * | 1/2018 | Smith, II | G06F 21/57 |
| 2020/0104061 A1 * | 4/2020 | Lin | G06F 3/0656 |

FOREIGN PATENT DOCUMENTS

JP    6049716 B2 * 12/2016   ......... G06F 12/1425

* cited by examiner

*Primary Examiner* — Matthew Smithers
*Assistant Examiner* — Shu Chun Gao
(74) *Attorney, Agent, or Firm* — Kagan Binder, PLLC

(57) ABSTRACT

A data storage system can consist of a network controller connected to a data storage device and a remote host. An attack mitigation strategy may be generated with an attack module connected to the network controller in response to detected data storage conditions in the data storage device. The attack mitigation strategy can be executed with the attack module by sending separate first and second security queries to the data storage device over time. At least a powered move attack can then be identified based on the second security query.

20 Claims, 5 Drawing Sheets

DATA STORAGE SYSTEM WITH POWERED MOVE ATTACK PROTECTION

SUMMARY

In some embodiments, a data storage system has a network controller connected to a data storage device and a remote host. An attack module connected to the network controller has a module controller to generate and execute an attack mitigation strategy involving periodic queries of the data storage device to identify a powered move attack on the data storage device.

Other embodiments of a data storage system have a network controller connected to a data storage device and a remote host. An attack mitigation strategy is generated by an attack module connected to the network controller in response to detected data storage conditions in the data storage device. The attack mitigation strategy then executes the attack module by sending separate first and second security queries to the data storage device over time. At least a powered move attack is then identified based on the second security query.

A data storage system can be used, in accordance with various embodiments, to connect a network controller to a data storage device and a remote host. An attack mitigation strategy is generated by an attack module connected to the network controller in response to predicted data storage conditions in the data storage device. The attack mitigation strategy then executes the attack module by sending separate first and second security queries to the data storage device over time. At least a powered move attack is then identified based on the second security query.

DETAILED DESCRIPTION

Generally, assorted embodiments of a data storage system are directed to protecting one or more data storage devices against a malicious third-party attack after the device has been initialized and verified as a trusted data storage repository.

The continued advancement of the capabilities of mobile, and stationary, computing devices has produced greater volumes of data that is created, transferred, and stored for temporary and/or permanent use. Data storage devices and systems have been developed to handle such increasing demand for large data capacity with relatively fast data access times. However, the sophistication of data storage systems has not kept pace with the sophistication of malicious parties that seek to steal, copy, manipulate, or otherwise jeopardize the integrity of the stored data as well as the security of various operational components of a data storage system. Hence, embodiments are directed to prevent, or at least mitigate the risk of, a security breach from a malicious third-party, such as a powered move attack.

In a non-limiting embodiment, an attack mitigation strategy is generated by an attack module of a data storage system with the strategy directed to establish a secure connection and a periodic challenge query that ensures the connected data storage device is genuine and has not been compromised by a malicious third-party attack. The ability to alter the challenge query over time allows the attack mitigation strategy to adapt timing, content, and frequency to avoid discovery from a third-party. A failure to correctly acknowledge the challenge query can prompt the system to conduct one or more security preservation measures that efficiently protects as much of the stored data and system components as possible moving forward. As a result, third-party attacks, and attempts, can be quickly identified and the effects of the attack can be isolated and minimized.

Figure 1:
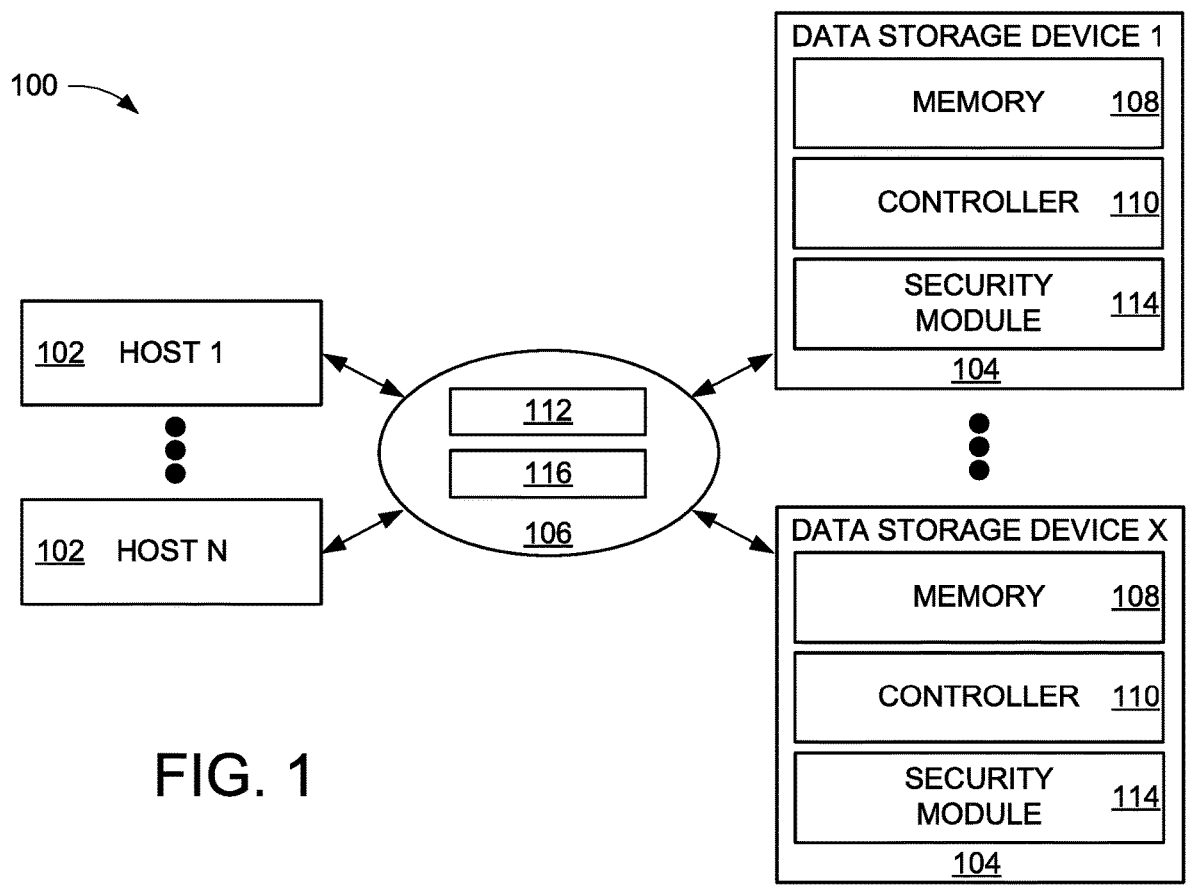
FIG. 1 depicts a block representation of an example data storage system in which various embodiments may be practiced.

FIG. 1 depicts a block representation of an example data storage system 100 in which assorted embodiments can be practiced. Any number (N) of hosts 102 can be connected to any number (X) of data storage devices 104 via one or more wired, or wireless, signal pathways managed as a network 106. The type and location of the assorted hosts 102 is not limited, but can be in separate positions in a common physical address, such as in the same building, but different positions in a rack, or separate physical addresses, such as in different states, countries, or continents. Similarly, the assorted data storage devices 104 can be in a common, or different, physical positions in yet utilized as an aggregate data repository for the collective connected hosts 102.

It is contemplated that the connected data storage devices 104 have different data storage structures and/or capabilities. For instance, data storage devices 104 can have different data capacities, error rates, types of data storage, data access latencies, and physical dimensions. However, some embodiments arrange each of the data storage devices 102 of a common type of memory 108, such as solid-state arrays and/or rotating magnetic media, which may have different or similar data capacity and data access performance.

Regardless of the type and capabilities of the connected data storage devices 104, local device controllers 110 can cooperate with one or more upstream network controllers 112 to satisfy data access requests from one or more remote hosts 102. The assorted controllers 110/112 can be any type of microprocessor or programmable circuitry capable of providing data access and maintenance capabilities with sufficient performance. The controllers 110/112 may individually, and collectively, provide one or more data buffering, or caching, schemes that increase the bandwidth and responsiveness of the system 100, which allows greater numbers of hosts 102 to concurrently be connected and serviced.

While the various data storage devices 104 can operate to satisfy data access requests without internal security protocol, some embodiments incorporate a security module 114 in each data storage device 104 to establish and maintain secure data interconnections within the system 100. That is, security measures can be installed, or merely operated, in a security module 114 portion of a data storage device 104 in hardware and/or software. The security module 114 can be complemented by one or more network security modules 116 that serve to control higher level security functions for the system 100 than the device-level modules 112.

Figure 2:
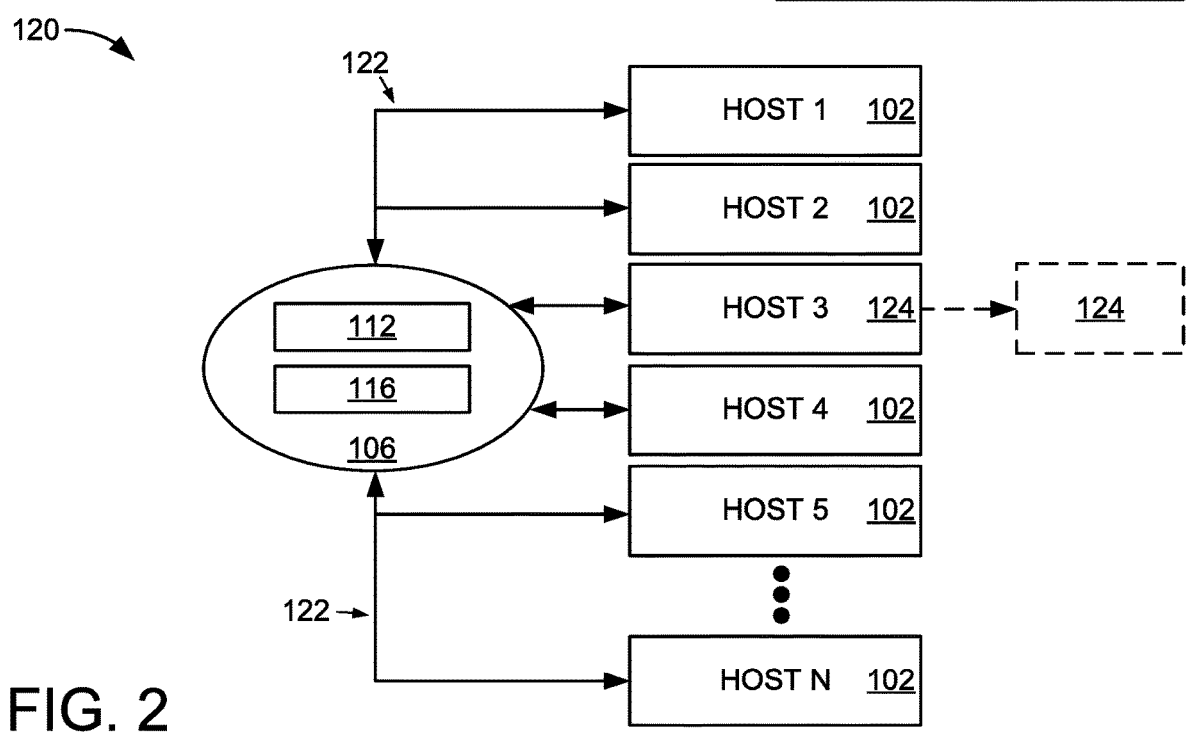
FIG. 2 is a block representation of portions of an example data storage system arranged in accordance with some embodiments.

As shown in the block representation of portions of an example data storage system 120 of FIG. 2, the various security modules 114/116 of the system 120 can initialize upon a power cycle to provide multiple parallel secure data pathways 122. Such pathways 122 can move commands, requests, user-generated data, and system-generated data between the respective devices 104 as well as to, and from, upstream network 106 components, such as controllers, nodes, switches, and routers, that provide the gateway to further upstream hosts 102.

The initialization of the respective data storage devices 104 and the generation of the secure data pathways 122 can involve one or more security procedures carried out by local, and network-level, security modules 114/116. For instance, device 104 initialization can involve one or more passwords, certificates, or keys being provided and verified before system security settings, parameters, and configurations are supplied to allow data encryption and/or compression in congruence with the rest of the data storage system 120. That is, data storage device 104 initialization can consist of multiple layers of call and response behavior between the controllers 110/112 and security modules 114/116 to establish a device's authenticity and trustworthiness followed by system security information that allows for further device 104 configuration to allow for the use of one or more secure data pathways 122.

In some embodiments, one or more data storage device 104 is a self-encrypting drive (SED) that has encryption capabilities, protocol, and settings that may differ from other devices 104 and from the network security module 116. The use of one or more SEDs can be accommodated at initialization with assorted security, encryption, and compression settings developed through the cooperation of the local and network security modules 114/116. The use of SEDs in the data storage system 120 can provide additional levels of security against third-party attacks by localize at least portions of data encryption at the point of storage. The localization of the data encryption with SEDs can further provide increased data processing efficiency as security portions of data processing are alleviated from the upstream network controller 112 and/or security module 116.

Despite the presence of robust security modules 114/116 and trusted data pathways 122 after device 104 initialization, the system 120 can be susceptible to third-party attacks. One such attack can be characterized as a side-channel attack where system 120 activity is monitored without altering any data storage parameters or the data itself. For instance, power consumption can be monitored over time, particularly during initialization of a device 104, to reconstruct assorted security and/or data activity that can be used by a third-party to gain unauthorized access into the system. As another example, the activity of the secure data pathways 122 can be monitored over time, without knowing what data is being transferred, to gain knowledge of aspects of the data storage system 120 that can be used to compromise a pathway 122, device 104, or network component.

Another type of third-party attack can be characterized as a powered move attack. As illustrated by segmented lines 124, a data storage device 126 can be maliciously moved after being initialized into the system 120 and establishing at least one secure data pathway 122. With the data storage device 126 being moved after initialization and execution of assorted security protocol, the device 126 will contain all the network security and encryption information, settings, and configurations that provide the third-party with full access into the data and components of the system 120 undetected as a malicious attacker.

While not required or limiting, a powered move attack can involve the physical disconnection of the data storage device 126 from the system 120 while power is continuously maintained to the device 126. Such power maintenance can be provided by various electrical power sources, such as batteries, capacitors, or a wired voltage supply. Regardless of the manner in which the data storage device 126 is supplied with continuous power so that a power cycle, reset, and security initialization are avoided, the maintenance of power after initialization provides the third-party attacker with full access to the data of the device 126 itself, access to the data of other data storage devices 104 of the system 120 due to having system 120 encryption and security settings, and the ability to manipulate system 120 settings as a trusted component to jeopardize the integrity of future data and system 120 activity.

Accordingly, embodiments are directed to prevent, or at least mitigate the effects of, powered move attacks with an attack mitigation strategy generated and carried out by an attack module. It is contemplated that an attack mitigation strategy can be adapted over time to variable data storage and system 120 conditions to provide continually optimized attack avoidance. An attack mitigation strategy can be generated, and adapted over time, to reduce the risk of other types of third-party attacks, such as side-channel attacks and infiltration of system components and/or data storage device 104.

Figure 3:
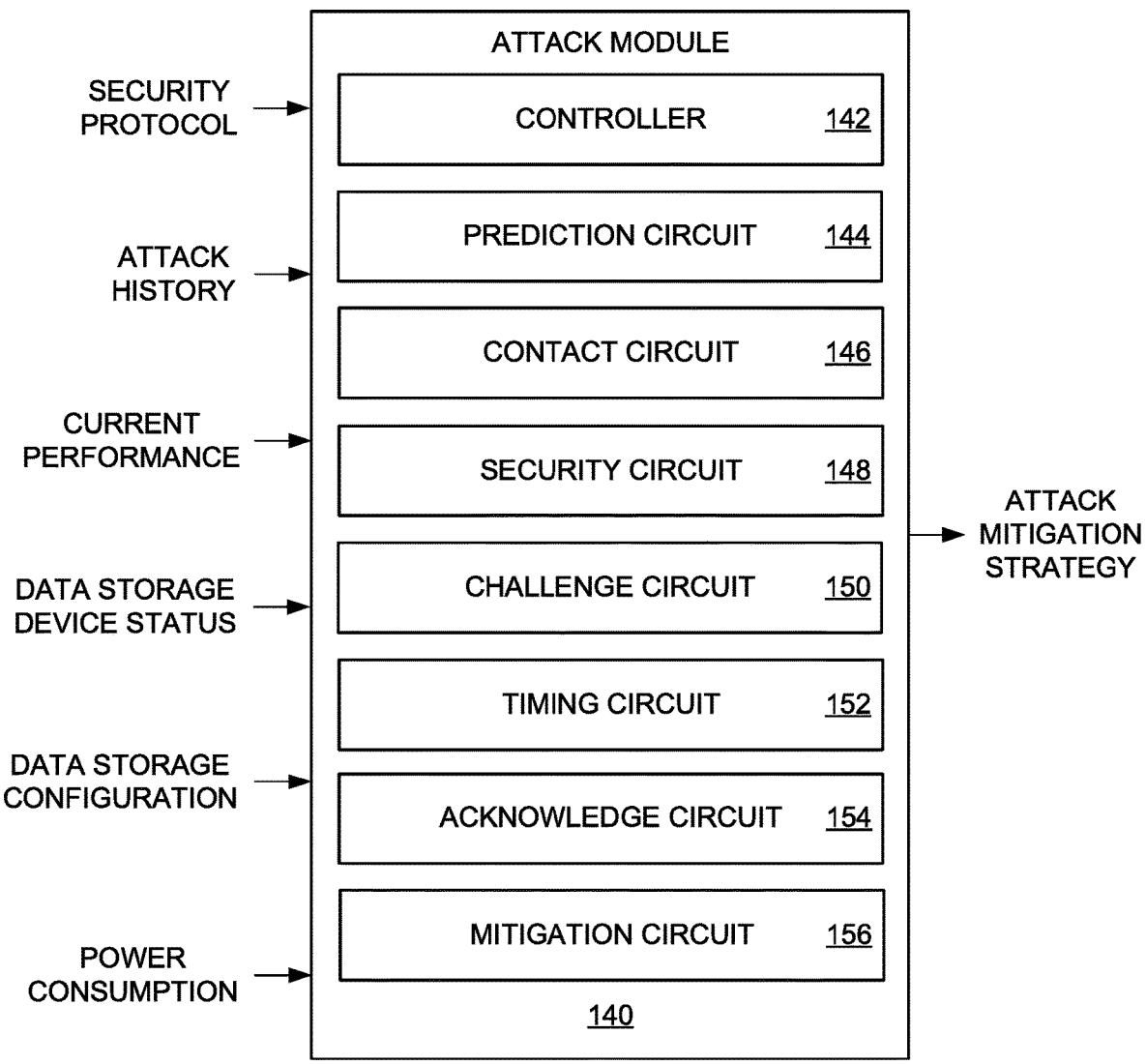
FIG. 3 displays a block representation of an example attack module that can be employed in a data storage system in accordance with assorted embodiments.

FIG. 3 depicts a block representation of an example attack module 140 that can be utilized in a data storage system 100/120 in accordance with various embodiments to prevent and/or mitigate at least powered move attacks. The module 140 can utilize one or more controllers 142 to generate and carry out one or more attack mitigation strategies from at least current data storage system conditions, such as security protocol, data storage configuration, data storage performance, and power consumption, along with past logged system conditions, such as successful third-party attacks, unsuccessful third-party attacks, firmware versions, and power consumption. It is noted that the module controller 142 may be resident anywhere in a data storage system and can be dedicated only to module 140 operation or shared with other system operations, such as a network controller 112 or local data storage device controller 110.

Regardless of the position and function of the module controller 142 within a data storage system, a generated attack mitigation strategy can prescribe proactive and reactive actions for one or more data storage devices, or other system component, to prevent, or at least reduce the damage associated with, a third-party attack. It is contemplated that an attack mitigation strategy reacts to detected data storage metrics, such as error rate, security credential failures, or firmware queries, as well as future data storage conditions predicted by a prediction circuit 144 of the module 140 with alterations to data storage operations to reduce the risk, or effectiveness, of a third-party attack. That is, an attack strategy can react to detected and/or predicted conditions with proactive actions that alter data storage parameters, settings, or operation with the intention to minimize the risk of a third-party attack being successful.

In accordance with some embodiments, an attack mitigation strategy prescribes future challenges to a connected data storage device to ensure the device remains a trustworthy repository for data. The attack module 140 can employ a contact circuit 146 that continuously, or sporadically, monitors operating parameters of portions of a data storage system. For instance, a contact circuit 146 may monitor data storage activity, performance, and settings over time to discover newly connected hosts, data storage devices, or network components. A contact circuit 146, in other embodiments, monitors power consumption patterns and/or security credential verification attempts over time to discover actual, and attempted, unauthorized accesses to data and/or components of a data storage system.

It is contemplated that the contact circuit 146, and/or the module controller 142, can log any number and type of data storage characteristics over time, such as security configurations, system component configurations, data storage performance, attack attempts, successful attacks, and security credential history. Such logged characteristics can be stored by the module 140 to be used by the prediction circuit 144 to forecast future system activity, security breaches, and system susceptibilities to third-party attacks. The ability to detect system activity, connected devices and components, along with attempted and successful third-party attacks allows the module controller 142 to ensure a generated attack mitigation strategy is optimized for the current, and predicted, data storage activity. That is, the monitoring of data storage system characteristics with the contact circuit 146 allows for intelligent strategy generation and adaptations to maintain the best possible attack prevention or mitigation given the current system conditions.

While data storage and system monitoring can result in a proactively dynamic attack mitigation strategy, the execution of the strategy can also provide dynamic proactive and reactive measures to prevent, or at least mitigate the effects of, a third-party attack. As a non-limiting example, the attack module 140 can utilize a security circuit 148 to establish and maintain a committed, secure protocol between the module 140 and a connected data storage device after the device has been initialized into the system. It is contemplated that the security circuit 148, in cooperation with the contact circuit 146, can detect the installation or initialization of a new data storage device into a system and proceed to develop and carry out a security scheme that establishes a secure protocol to be used over time to ensure at least a powered move attack is not successful.

The security circuit 148, through the execution of a security scheme portion of an attack mitigation strategy, can establish a secure interconnection, such as a transport layer security (TLS) or secure sockets layer (SSL), data pathway to create a key that the module 140 and newly installed/initiated data storage device will each have. The key may be unique from other security credentials used during initialization and/or data storage operations, such as certificates, passwords, and phrases. The security circuit 148 can maintain, refresh, or re-establish the secure connection and/or generated keys with a data storage device over time to heighten the reliability of the device interconnection.

Some embodiments utilize unique keys for each separate data storage device of a system while other embodiments share keys, or key derivatives, to reduce the amount of key storage and processing necessary from the module controller 142. The generation, and adaptation, of keys that secure a device/module interconnection provides the ability to strategically contact the connected device with security questions that verify the device has not been attacked, mirrored, or otherwise compromised by a third-party attack. In other words, the security circuit 148 can maintain a secure connection that can be utilized by the attack module 140 over time to ensure a third-party attack has not compromised the device.

It is noted that the attack mitigation strategy may prescribe constant communication between the module 140 and connected device. However, such constant communication can be processing intensive and inefficient, particularly in data storage systems with high frequency data accesses. Accordingly, various embodiments utilize a challenge circuit 150 of the attack module 140 to generate and administer queries to a connected data storage device over time to ensure the device has not been attacked or otherwise compromised by a third-party. The challenge circuit 150 may generate any type of query and, in some embodiments, creates a pattern, cycle, or list of different challenge questions that can be used in the execution of the attack mitigation strategy depending of the detected, or predicted, data storage characteristics of a system.

Although not required or limiting, the challenge circuit 150 can provide varying device query encryption, compression, and length to prevent query reconstruction from power or other system resource tracking by a third-party. That is, the challenge circuit 150 can adapt to detected, and predicted, data storage characteristics by changing the type of query, how the query is processed, and the size of the query to avoid third-party reconstruction of the query merely by passively system activity monitoring.

The avoidance of query reconstruction may be aided by altering the delivery of queries to the data storage device. As such, a timing circuit 152 may cooperate with the challenge circuit 150 to intelligently modify when a query is delivered to a connected device to make passive query detection and reconstruction more difficult. For example, the timing circuit 152 can identify when device queries have become routine, predictable, or patterned in a manner that increases the risk of a third-party to identify and/or reconstruct the queries or acknowledgments from a device.

It is contemplated that the timing circuit 152 can proactively and reactively alter the timing and/or other delivery parameters, such as power consumption or size of a query data package. Hence, the timing circuit 152 can provide the attack mitigation strategy with multiple different manners of minimizing the risk of third-party detection and reconstruction of queries or device acknowledgements. The ability to proactively alter query delivery timing combined with differently configured queries from the challenge circuit 150 makes the attack mitigation strategy quite robust against third-party infiltration. In yet, the addition of reactive query delivery timing alterations can further avoid a query or device acknowledgment from being compromised by a third-party.

The maintenance of the subject matter of queries with the challenge circuit 150 and the delivery of the queries with the timing circuit 152 can protect the integrity of the queries themselves. An acknowledge circuit 154 can provide the attack module 140 and attack mitigation strategy with device answers that should be produced by a genuine, trustworthy, verified downstream data storage device. While it is contemplated that the attack module 140 can verify device answers to queries as they are received, the proactive generation of answers with the acknowledge circuit 154 allows the module 140 and strategy to quickly identify an incorrect device answer to a query, which can result in quicker isolation of a third-party attack than if the module controller 142 had to generate an answer to compare the provided device answer to in real-time.

The sophisticated query generation, delivery, and answer analysis with the various aspects of the attack module 140 allows the attack mitigation strategy to provide efficient proactive and reactive alterations to data storage and system settings and operational parameters to prevent a third-party attack from being successful or minimizing the information attained as a result of a successful infiltration of the data storage system. In practice, the acknowledge circuit 154 can provide answers to a device that can be used in response to a query at a later time or generate answers to queries that are stored in the upstream attack module 140.

Through the operation of the acknowledge circuit 154, the polling of a data storage device from the attack module, in accordance with the attack mitigation strategy, with a query and the answer of that query from the device can be optimized to be more efficient, reliable, and secure by adapting the queries, delivery, and answers to detected, and predicted data system conditions. Despite the use of intelligent and dynamic queries over time to ensure a data storage device has not been compromised by a third-party attack, unauthorized attacks can occur. The use of secure module queries and device answers at prescribed times during the operational life of a data storage device, third-party attacks can be detected early in the process of infiltrating the data storage device. It is contemplated that the logging of queries, answers, and system conditions can allow the prediction circuit 144 to forecast a third-party attack before it begins or after an attack is started, but before it compromises the device or stored data.

With the early detection, or prediction, of third-party attacks, an attack mitigation portion of the attack mitigation strategy can be efficiently executed to alter at least one device operating condition to thwart the attack from being successful or reduce the amount of data, security settings, and system information that is attained during the attack. That is, a mitigation circuit 156 of the attack module 140 can monitor data storage system operations and conditions over time to provide the attack mitigation strategy one or more operational alterations to execute at the detection, or prediction, of a third-party attack to lessen, or prevent, the attack from compromising the data storage system.

It is contemplated that the operational alterations generated by the mitigation circuit 156 are not static over time and are changed in response to detected and/or predicted system conditions. By generating new attack mitigation activity with the mitigation circuit 156 after detecting, or predicting, changes in data storage conditions that may not directly indicate a third-party attack is imminent, or has already commenced, the attack module 140, and attack mitigation strategy, can provide robust and intelligent data storage alterations when an attack is occurring or is imminent.

Figure 4:
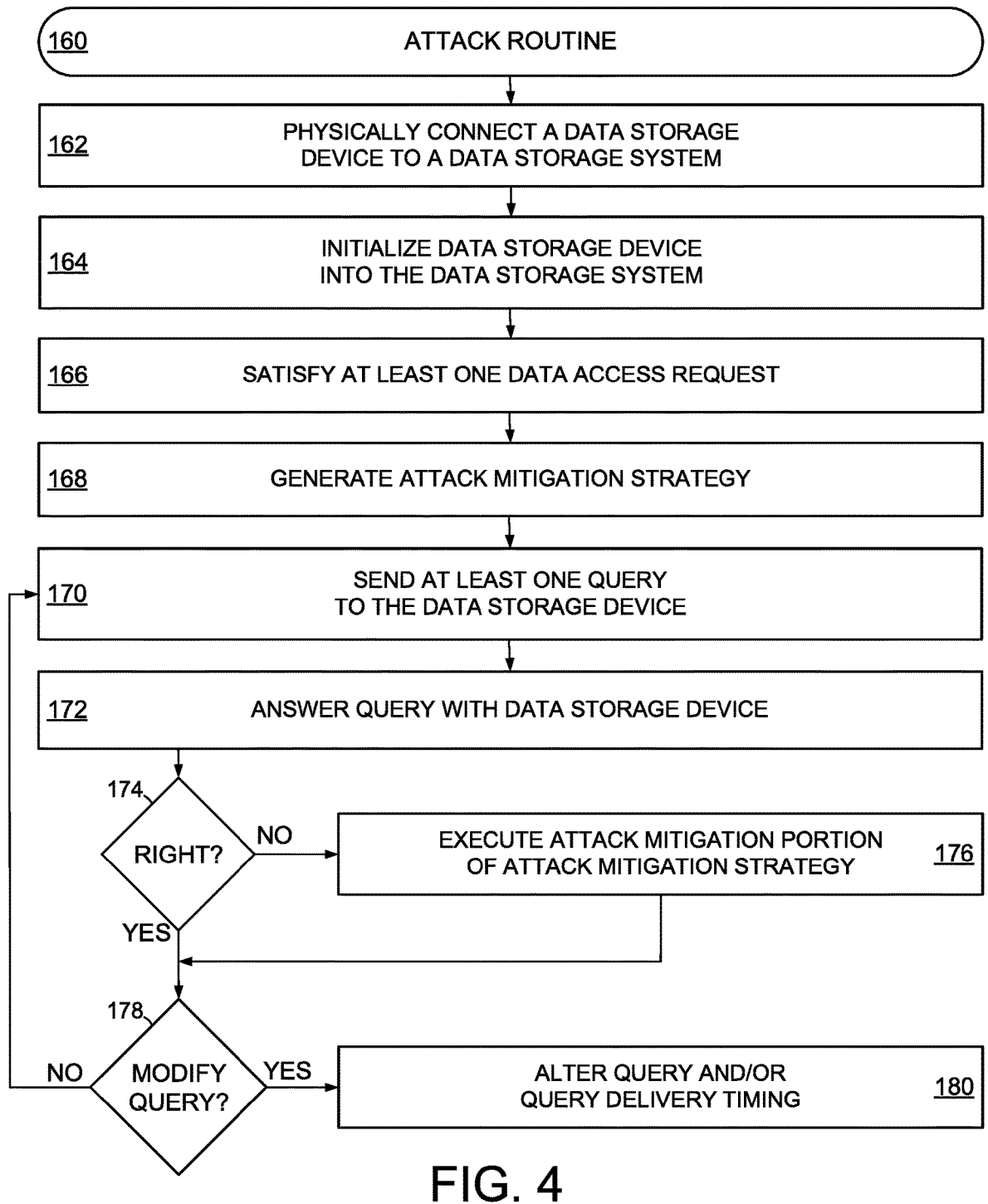
FIG. 4 shows an example attack routine that can be carried out with the embodiments of FIGS. 1-3 in accordance with some embodiments.

FIG. 4 depicts an example attack routine 160 that can be carried out with the assorted embodiments of FIGS. 1-3. Initially, at least one data storage device is physically connected to a data storage system port, interface, or bus in step 162 to allow power and data to flow to, and from, the device. Step 164 utilizes the electrical connections to initialize the data storage device into the data storage system. It is noted that while not required, the device initialization of step 164 can involve unlocking the data storage device to allow data access requests of the data storage system to be satisfied by the data storage device. As such, step 164 may carry out one or more autonomous, or cooperative, security initialization processes where keys, certificates, encryption schemes, and passwords can be generated, shared, and employed.

Once the data storage device is initialized into the data storage system, step 166 can conduct one or more actions, such as data storage, data retrieval, or data storage maintenance, in the service of a data access request. That is, an initialized data storage device is used in step 166 to satisfy a remote-generated request by taking at least one action that stores, retrieves, moves, or deletes data. The operation of the data storage device can be monitored by an attack module resident in the data storage device, or some other component of the data storage system, to allow at least one attack mitigation strategy to be generated in step 168 that is customized to the current and predicted data storage performance and conditions of the system.

While a default, or existing, attack mitigation strategy can be in place during steps 164 and 166, some embodiments generate a new strategy, or modify an existing strategy, once step 166 provides current data storage conditions and performance metrics, such as error rate, data access latency, encryption settings, compression parameters, and security protocol. An attack mitigation strategy can prescribe one or more proactive and/or reactive actions that can be executed by various portions of the data storage system immediately, or in response to an encountered trigger threshold. For instance, a security protocol can proactively be changed or reactively altered in response to a detected, or predicted, third-party attack. As another non-limiting example, an encryption scheme can be proactively set at a first level while data stored in a data storage device is at a low sensitivity to reduce data access times and reactively altered to a second level when data of a higher sensitivity is stored.

Along with proactive and reactive actions to be taken by portions of the data storage system, an attack mitigation strategy can prescribe a device query arrangement over time that ensures the device has not been victim of a powered move third-party attack. A query arrangement can prescribe a schedule of queries that can be cycled, patterned, or reactionary to detected, or predicted, data storage system activity. In other words, step 168 can generate an attack mitigation strategy that provides a device query arrangement that dynamically reacts to data storage and security activity, such as patterned power consumption or high numbers of security/firmware credential interactions, by changing the type, size, delivery timing, numbers, and/or power consumption of a query.

In accordance with the attack mitigation strategy, at least one query is sent to at least one data storage device in step 170 that is processed and answered in step 172 with an acknowledgement from the local data storage device controller. It is contemplated that the device's answer can be a scripted or spontaneous response to the query, such as the serial number, last data access request latency, or current available data storage capacity. Other embodiments utilize a simple timed response, such as send signal in five milliseconds. The ability to mix and adapt the type of query and answer from steps 170 and 172 allows a strategy to be both efficient and effective at identifying if an attack is occurring and if an attack has been successful.

The device's answer supplied in step 172 is evaluated in decision 174 by the attack module controller to determine if the device is securely connected, verifiable as not compromised by an attack, and not currently being attacked by a third-party. It is contemplated that decision 174 employs the attack module controller to evaluate more than just the answer supplied in response to the query, such as additional system conditions, activity, or settings. Decision 174, in some embodiments, generates one or more tests to clarify the status of the device after the answer, such as a follow-up query that is different than the query of step 170.

If the attack module controller determines a third-party attack is being attempted or has been successful in compromising some, or all, of the data storage device, step 176 begins to execute the mitigation portion of the attack mitigation strategy. The mitigation portion may involve any number, and type, of actions that attempt to secure data from being copied, moved, or otherwise corrupted while other actions can be directed at terminating the ongoing, or attempted, attack. For instance, the attack mitigation strategy in step 176 can prescribe concurrent actions, such as copying data, deleting data, garbage collecting data, encrypting data, compressing data, changing security settings, reverting firmware to a previous secure version, deactivating data pathways, resetting security credentials, and powering the device off, to reduce the loss of data and device to a third-party attack. It is contemplated that step 176 engages in one or more actions, which may be similar or dissimilar to the actions taken for the attacked device, to secure components and stored data other than that of the attacked data storage device.

In the event decision 174 determines that no third-party attack is imminent, ongoing, or has been successful, routine 160 evaluates if an existing attack mitigation query is to be modified prior to the next scheduled delivery in decision 178. While an existing device query schedule may prescribe the use of different queries at different times and/or in response to assorted detected, or predicted, system conditions and activity, the evaluation of the query in decision 178 can respond to how one or more previous queries were answered, along with other current and predicted system conditions and activity at the time the previous query was supplied and answered, to intelligently determine the effectiveness and appropriateness of one or more future queries. That is, decision 178 can conclude if future scheduled queries, or unscheduled types, sizes, or delivery times of queries, are sub-optimal at discovering an ongoing, unsuccessful, or successful third-party attack.

A determination that a query is to be modified prompts step 180 to alter either a query schedule or a list of available queries for future polling of a data storage device. At the conclusion of step 180, or if decision 178 determines no query modifications are needed, routine 160 returns to step 170 where an additional query is supplied to the data storage device. The consistent supply of queries that are evaluated for effectiveness and altered to provide optimal detection of third-party attacks ensures queries are not discovered and reconstructed by third-parties and various types of attacks are prevented. The mitigation of an ongoing attack with the attack mitigation strategy further provides optimal reaction to third-party attacks.

Figure 5:
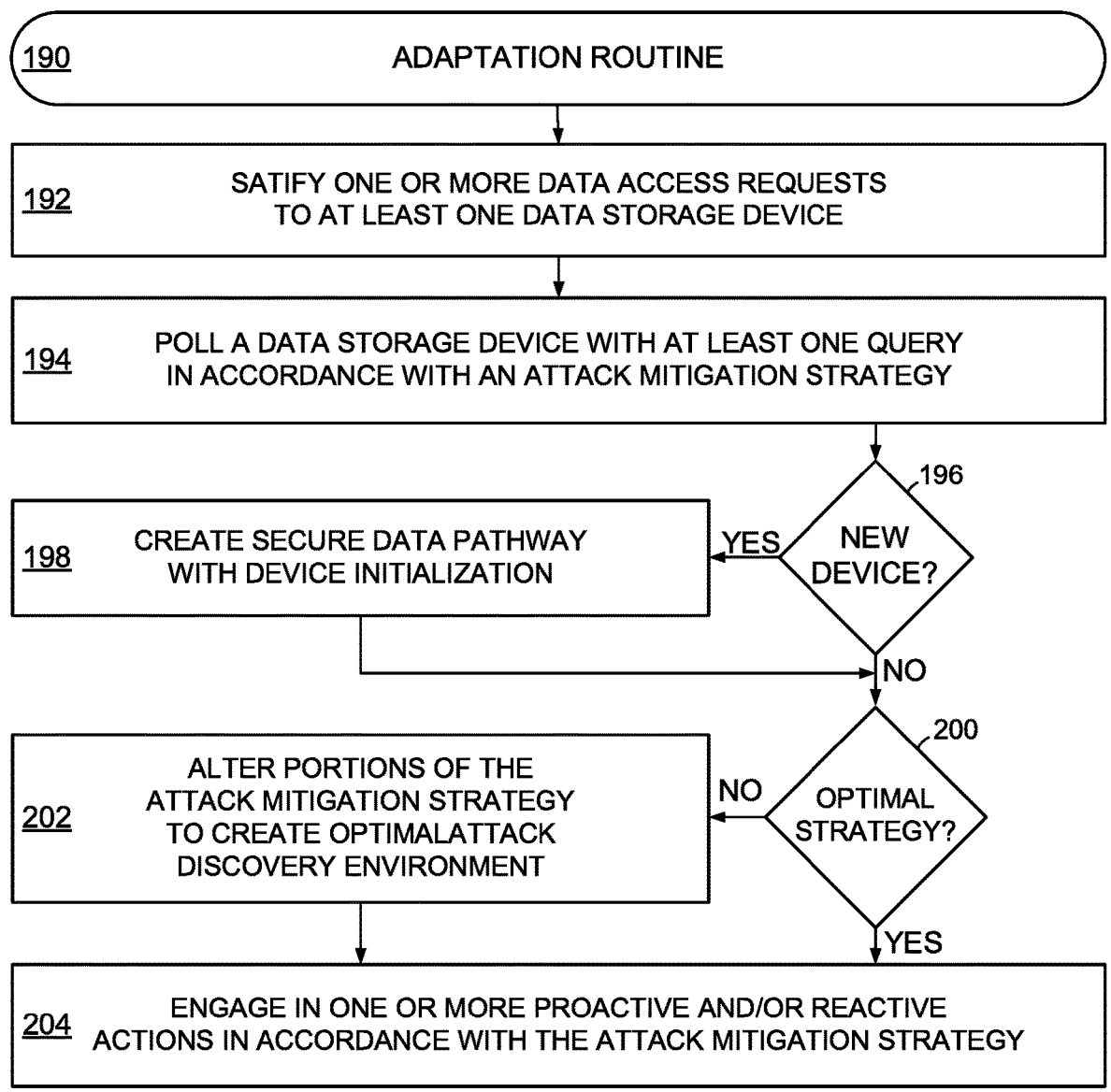
FIG. 5 illustrates an example adaptation routine that can be executed with the embodiments of FIGS. 1-3 in accordance with various embodiments.

FIG. 5 depicts an example adaptation routine 190 that can utilize the embodiments of FIGS. 1-3 to provide optimal monitoring of one or more data storage devices of a distributed data storage system for third-party attacks. Step 192 begins by satisfying one or more data access requests with at least one data storage device connected to a remote host via a network controller. A connected attack module utilizes an existing attack mitigation strategy in step 194 to poll the connected data storage device with at least one query to ensure the device has not been infiltrated and/or corrupted by a third-party attack. It is contemplated that step 194 is repeated any number of times for one or more different connected data storage devices with query answers being respectively received and processed by the attack module.

At some time after a connected device is polled in step 194, decision 196 evaluates if a new data storage device has been connected to the data storage system. Such connection may involve the physical and/or electrical activation of a data storage device to allow at least one secure data pathway to be created in step 198 through the execution of a device initialization procedure. It is contemplated that the initialization procedure of step 198 can involve autonomous device activity and/or interactions with a network controller that establish the data storage device as a genuine, verified, and trustworthy repository for data. In some embodiments, the initialization of step 198 involves adjusting device settings and operational parameters to match other, previously initialized, data storage devices while other embodiments adjust less than all, or all, device settings and parameters to a configuration unique to the individual data storage device.

The initialization of the newly installed data storage device, or if no device is newly connected/initialized, triggers decision 200 to assess if the existing attack mitigation strategy is optimal given the current, and predicted, data storage activity and conditions with the addition of the newly installed device. If the existing strategy is sub-optimal, step 202 alters portions of the existing strategy or generates an entirely new strategy to create an optimal operational environment for third-party attacks to be discovered and handled with minimal infiltration into the distributed data storage system.

The new attack mitigation strategy, or the old attack mitigation strategy in the event decision 200 determines the strategy is optimal and does not need adaptations, is employed in step 204 to engage in one or more proactive and/or reactive actions to alter and optimize the data storage conditions in response to the newly installed data storage device. The actions employed in step 204 are not limited, but can involve updating security settings, such as encryption, compression, firmware, or credentials, along with changing data storage parameters, such as metadata storage, caching, mirroring, parity, and mapping. The altered data storage system is then utilized to service one or more data access requests from at least one remote host by returning to step 192. The ability to adapt an attack mitigation strategy, along with the ability to adapt device queries, in response to detected, and predicted, data storage conditions, performance, and activity allows a data storage system to maintain sophisticated third-party attack avoidance and damage mitigation.

Figure 6:
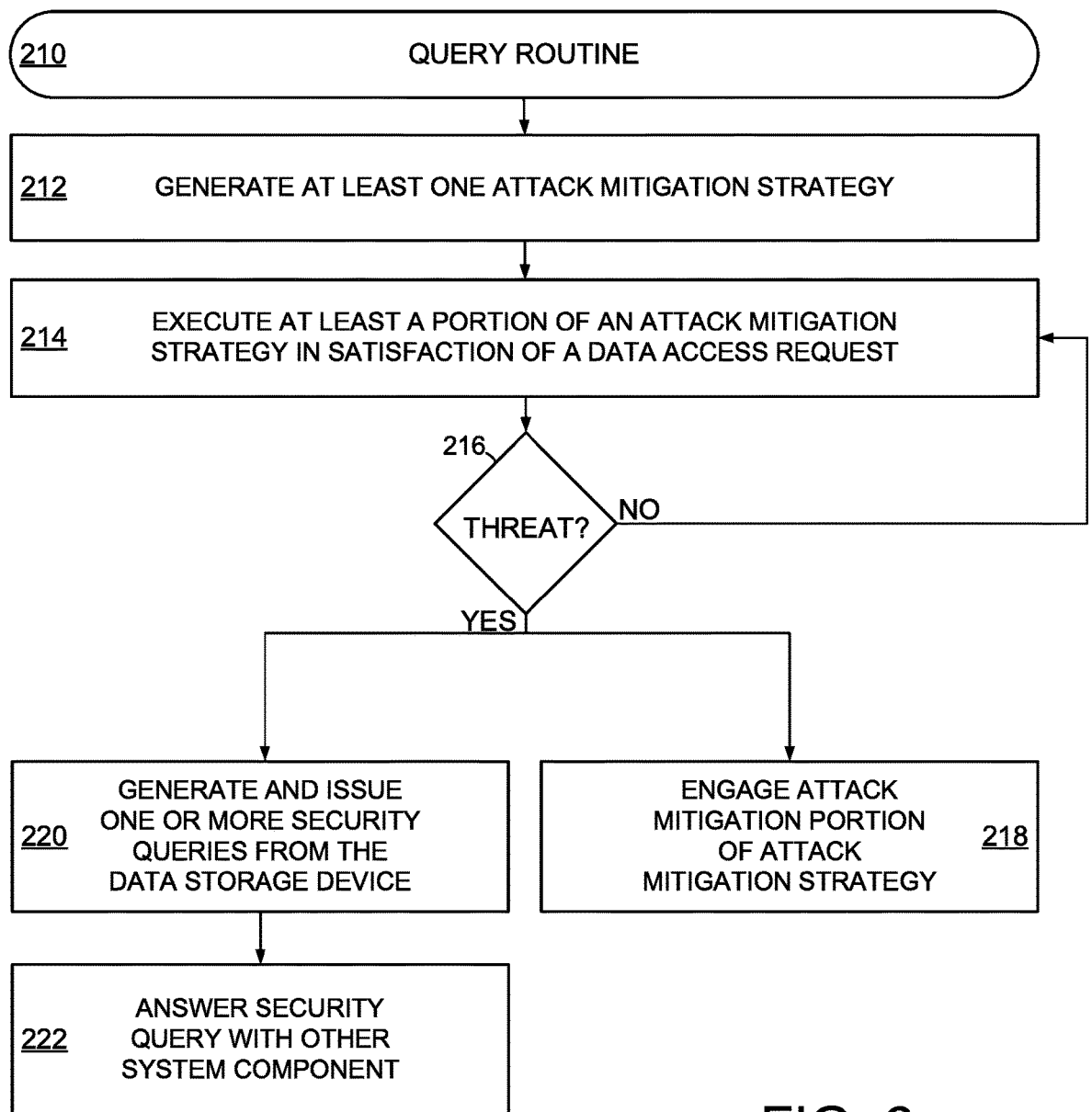
FIG. 6 depicts an example query routine that can be utilized with the assorted embodiments of FIGS. 1-3.

FIG. 6 depicts an example query routine 210 that can be carried out by a data storage system in accordance with various embodiments. The routine 210 may initiate in an unlimited variety of forms where at least one attack mitigation strategy is generated in step 212. For instance, a data storage device may be newly installed, a data storage condition may have newly changed, or logged system activity may prompt a new/changed strategy. Regardless of the manner in which an attack mitigation strategy is generated, step 214 executes at least a portion of the strategy in the satisfaction of one or more remote host data access requests involving user-generated data.

A connected attack module positioned at the network-level or the device-level of the data storage system can continuously, or sporadically, monitor the current, and predicted, data storage conditions and performance during the single, or cyclic execution of step 214 for threats of attack with decision 216. That is, any connected attack module of the distributed data storage system in decision 216 can monitor system operations to identify a threat associated with a third-party attack. It is noted that a threat of attack may be an identified susceptibility to third-party infiltration, an imminent unauthorized access to data or a system component, or a currently occurring infiltration of system data and/or components.

The identification of a threat in decision 216 can be prescribed by the attack mitigation strategy. For instance, a strategy can issue threat identifying queries at predetermined times or in response to detected system activity to accurately and efficiently pinpoint where, how, and perhaps when a third-party attack will occur. Due to the sophisticated ability of an attack module to generate and maintain an attack mitigation strategy that handles different types of attacks, and various stages of an attack, in adaptive ways, routine 210 can respond to an identified threat from decision 216 in a variety of ways. As shown, step 218 can respond to a threat by engaging in an attack mitigation process prescribed by the attack mitigation strategy, which may be similar to, or different than, the process described in step 176 of routine 160.

The mitigation of an ongoing attack, or attack initiating activity, via step 218 can occur independently or concurrently with other actions prescribed by the attack mitigation strategy. In accordance with some embodiments, step 220 can generate one or more security queries that are issued to other data storage devices, network components, or hosts of the distributed data storage system. Such device initiated security queries can assess the type, reach, severity, and exposure of the threat identified from decision 216. It is contemplated that the device initiated security queries are scripted prior to the identification of a threat by the attack mitigation strategy. However, other embodiments reactively create the security queries with the local data storage device controller in response to the detected data storage, threat, and logged attack history.

Issuing one or more security queries from a data storage device is then answered in step 222 by at least one other network component, such as a host, network controller, or other data storage device. The answer of step 222 can be generated or supplied by the answering component and contains data, signal, or information that confirms the component has continuously been trustworthy, genuine, verified, and secure since the previous query or component initialization into the data storage system. A security answer may be related to hardware of the queried component, such as a serial number of a processor, operational, such as previous data access latency or number of connected hosts/devices, or historical, such as number of commands issued in the previous minute or number of unsuccessful attacks in the past day.

The ability to create, modify, deliver, and confirm an answer from a network component allows for two-way security queries to pass between a network controller and a downstream data storage device controller. It is noted that a single attack module may conduct two-way security querying and answering with the module being positioned anywhere in the data storage system. However, some embodiments configure separate attack modules in the respective system components with matching, or dissimilar, circuitry to conduct two-way querying and answering. It is contemplated that two-way security queries and answers can be concurrently passed between separate system components to efficiently verify multiple different aspects as secure and free from third-party tampering and infiltration. For instance, a data storage device can verify the integrity of the encryption or firmware of the network controller with at least one query while the data, firmware, or security protocol of the data storage device is verified with one or more queries from the network controller.

Through the use of one-way or two-way periodic system component querying, at least one component can be confirmed as trustworthy and secure without constant monitoring. The adaptation of queries, answers, and timing to current and predicted data storage conditions and performance via an attack mitigation strategy maintains efficient and effective verification of a data storage device over time. The use of an attack mitigation strategy to identify third-party attack susceptibility, ongoing attacks, and successful attacks allows proactive and reactive actions to be taken to reduce the infiltration of a third-party attack, the volume of data compromised by an attack, and the amount of time needed to reconstruct the data and security protocol compromised by an attack.

It is contemplated that a committed protocol between a system controller and data storage device itself is used during device installation/initialization into the data storage system. During a device installation, the network controller can contact the device and a key manager to get at least one key that unlocks the device through a key management protocol. Once completed, the network controller and the data storage device will establish a TLS connection to create a key that the network controller and device will each have. The network controller can then establish a daemon process that contacts the data storage device on a regular basis and ask the device for its key. A supplied key from the device can then be verified by the network controller.

Every time the network controller sends the shared key to the data storage device, the key can be encrypted to protect against a replay attack. If the device's answer is correct, the system controller would send an acknowledge signal to the device to proceed with nominal data storage and data maintenance activity. The acknowledge signal can prompt a new time count for when the device should be verified again. In response to the time count, the network controller sets the attack mitigation strategy and daemon to query the device again in the future. Such query scheduling allows for randomization and other timing deviations to be used to prevent planned attacks from third-parties.

In the event the data storage device does not receive an acknowledge signal back from the network controller and instead gets an error or nothing, the device may either wait for the network controller to try again or immediately execute an attack mitigation portion of the attack mitigation strategy. Such attack mitigation portion can involve locking the data storage device in a manner similar to powering the device down, which requires a key manager to access the security, data, and software aspects of the device. As a result, a powered move attack would end with a locked data storage device.

Some embodiments of an attack mitigation strategy do not require a key every time a data storage device is queried. For instance, a security query can involve a challenge question or random data string request that is encrypted from the network controller with a shared key and sent to the downstream data storage device. Subsequently, the device decrypts the security query with the shared key and validates it. As such, a data storage device can operate individually to identify and mitigate an attack on the device, which contrasts a network controller solely identifying attacks on other components of a distributed data storage system. The use of alternatives to a key query reduces the time to setup a TLS session each time a query is to be issued and instead a TLS session can be initiated once with the shared key never leaving the data storage device or network controller after device initialization into the system.

It is contemplated that a challenge question query may involve an awake time delay for the next query to be issued, which can further confuse a third-party attacker. Through the use of random callbacks from at least one data storage device, security of the device can be ensured without constant supervision. Random callbacks can further prevent a malicious powered move attack.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. An apparatus comprising:
   a network controller connected to a data storage device and a remote host; and
   an attack module connected to the network controller, the attack module comprising a module controller configured to generate and execute an attack mitigation strategy comprising using periodic queries of the data storage device to identify a powered move attack on the data storage device, while power is continuously maintained to the data storage device.

2. The apparatus of claim 1, wherein the attack module is resident in the data storage device.

3. The apparatus of claim 1, wherein the attack module is resident in a network component with the network controller, upstream from the data storage device.

4. The apparatus of claim 1, wherein the data storage device is a self-encrypting device.

5. The apparatus of claim 1, wherein the network controller is connected to the data storage device via a secure data pathway.

6. A method comprising:
   connecting a network controller to a data storage device and a remote host;
   generating an attack mitigation strategy with an attack module connected to the network controller, the generating in response to detected data storage conditions in the data storage device;
   executing the generated attack mitigation strategy with the attack module by sending separate first and second security queries to the data storage device at first and second delivery times, respectively; and
   identifying a powered move attack on the data storage device based on the second security query.

7. The method of claim 6, wherein the first security query is different than the second security query.

8. The method of claim 6, wherein the attack mitigation strategy prescribes a delivery schedule for the first delivery time of the first security query and the second delivery time of the second security query, the delivery schedule being prescribed in response to detected data storage conditions.

9. The method of claim 8, wherein the delivery schedule injects a time delay between the first delivery time of the first security query and the second delivery time of the second security query.

10. The method of claim 8, wherein the delivery schedule is prescribed so as to randomize a delivery time for at least one of the first security query, the second security query, a third security query at a third delivery time, and a fourth security query at a fourth delivery time.

11. The method of claim 6, wherein the data storage device answers the first security query with a first response and answers the second security query with a second response, the first and second responses being different.

12. The method of claim 11, wherein the answer to the first security query is acknowledged by the attack module with a signal to the data storage device, and wherein the data storage device locks in response to the signal not being received in response to the answer to the second security question.

13. The method of claim 12, wherein the data storage device locks by changing a key shared by the network controller and the data storage device.

14. The method of claim 12, wherein the data storage device locks by powering down.

15. The method of claim 11, wherein the attack module changes the attack mitigation strategy based on the received second response.

16. The method of claim 11, wherein the attack module changes the second security query based on the received first response.

17. A method comprising:
   connecting a network controller to a data storage device and a remote host;
   generating an attack mitigation strategy with an attack module connected to the network controller, the generating in response to predicted data storage conditions in the data storage device;
   executing the generated attack mitigation strategy with the attack module by sending separate first and second security queries to the data storage device at first and second delivery times, respectively; and
   identifying a powered move attack on the data storage device based on the second security query.

18. The method of claim 17, wherein the attack module identifies a susceptibility to a third-party attack related to at least one of the first and second security queries.

19. The method of claim 17, wherein the attack module identifies an ongoing third-party attack related to at least one of the first and second security queries.

20. The method of claim 17, wherein the attack module identifies a successful previous third-party attack related to at least one of the first and second security queries.

* * * * *